United States Patent
Harres

(10) Patent No.: US 7,027,685 B2
(45) Date of Patent: Apr. 11, 2006

(54) APPARATUS AND METHOD FOR FIBER OPTIC LINK WITH BUILT-IN TEST

(75) Inventor: Daniel N. Harres, Belleville, IL (US)

(73) Assignee: The Boeing Company, Chicago, IL (US)

( * ) Notice: Subject to any disclaimer, the term of this patent is extended or adjusted under 35 U.S.C. 154(b) by 197 days.

(21) Appl. No.: 10/644,124

(22) Filed: Aug. 20, 2003

(65) Prior Publication Data

US 2005/0041917 A1    Feb. 24, 2005

(51) Int. Cl.
    *G02B 6/28*    (2006.01)
(52) U.S. Cl. .......................................... 385/24; 385/15
(58) Field of Classification Search ............ 385/15–24, 385/31–32; 372/23; 398/30–33, 162, 182, 398/201, 202
    See application file for complete search history.

(56) References Cited

U.S. PATENT DOCUMENTS

| | | |
|---|---|---|
| 4,471,494 A | 9/1984 | Keil et al. |
| 5,119,679 A | 6/1992 | Frisch |
| 5,222,166 A | 6/1993 | Weltha |
| 5,295,512 A | 3/1994 | Adams |
| 5,382,785 A | 1/1995 | Rink |
| 5,402,433 A | 3/1995 | Stiscia |
| 5,448,629 A | 9/1995 | Bosch et al. |
| 5,485,300 A | 1/1996 | Daley |
| 5,488,621 A | 1/1996 | Slawson et al. |
| 5,515,361 A | 5/1996 | Li et al. |
| 5,532,864 A * | 7/1996 | Alexander et al. ............ 398/31 |
| 5,653,174 A | 8/1997 | Halus |
| 5,673,132 A | 9/1997 | Carbone, Jr. et al. |
| 5,809,049 A | 9/1998 | Schaefer et al. |
| 5,809,220 A | 9/1998 | Morrison et al. |
| 5,812,572 A | 9/1998 | King et al. |
| 5,822,099 A | 10/1998 | Takamatsu |
| 5,903,375 A | 5/1999 | Horiuchi et al. |
| 5,965,876 A | 10/1999 | Anemogiannis et al. |
| 6,188,498 B1 | 2/2001 | Link et al. |
| 6,266,169 B1 | 7/2001 | Tomooka et al. |
| 6,396,897 B1 | 5/2002 | Ebrahimifard et al. |
| 6,549,310 B1 | 4/2003 | Kuchta et al. |
| 6,614,236 B1 | 9/2003 | Karam |

FOREIGN PATENT DOCUMENTS

| | | |
|---|---|---|
| EP | 1035679 | 9/2000 |
| JP | 08181656 | 7/1996 |
| WO | WO 01/86838 A2 | 11/2001 |

* cited by examiner

*Primary Examiner*—Phan T. H. Palmer
(74) *Attorney, Agent, or Firm*—Black Lowe & Graham, PLLC

(57) ABSTRACT

Apparatus and methods for fiber optic links having a built-in test are disclosed. In one embodiment, an optical component includes a signal source, and a controller operatively coupled to the signal source. The signal source is adapted to output a first combined optical signal having a first optical signal portion of a first frequency and a second optical signal portion of a second frequency. The first frequency is substantially greater than the second frequency. The controller is adapted to induce the signal source to output the first and second optical signal portions, the first optical signal portion being associated with a main communication function and the second optical signal portion being associated with a monitoring function.

30 Claims, 3 Drawing Sheets

APPARATUS AND METHOD FOR FIBER OPTIC LINK WITH BUILT-IN TEST

FIELD OF THE INVENTION

The present disclosure relates to apparatus and methods for improved fiber optic systems, and more specifically, to fiber optic links having a built-in test.

BACKGROUND OF THE INVENTION

Fiber optic technology has become an essential technology for the implementation of digital networks operating at gigabit rates and above. Maintenance of such links is a pressing issue with both military and commercial customers. The ability to isolate a link failure to the particular component (e.g. transmitter, cable plant, receiver, etc.) is needed.

Some conventional transceivers have the ability to monitor laser power, detector current, transceiver temperature, and other parameters. Such transceivers suffer from several disadvantages. For example, in such conventional transceivers, the main processor must include in its Operational Flight Program (OFP) and in its timing load the instructions necessary to perform the monitoring and information distillation processes for separating and interpreting the portion or portions of the signals associated with monitoring, thereby complicating and slowing the main processor program. Also, if the link stops operating, or operates erratically, then there is no possibility of performing an after-the-event fault isolation. Therefore, there exists an unmet need for a means for monitoring the performance of a fiber optic link (e.g. transmitter power, receiver amplitude, cable plant loss, etc.) without substantially interfering with the main communication function that the fiber optic link is intended to perform.

SUMMARY OF THE INVENTION

The present invention is directed to apparatus and methods for improved fiber optic systems, and more specifically, to fiber optic links having a built-in test. Apparatus and methods in accordance with the present invention may advantageously provide improved monitoring and fault isolation capabilities, and improved fiber optic system performance, in comparison with prior art systems.

In one embodiment, an optical component includes a signal source, and a controller operatively coupled to the signal source. The signal source is adapted to output a first combined optical signal having a first optical signal portion of a first frequency and a second optical signal portion of a second frequency. The first frequency is substantially greater than the second frequency. The controller is adapted to induce the signal source to output the first and second optical signal portions, the first optical signal portion being associated with a main communication function and the second optical signal portion being associated with a monitoring function.

BRIEF DESCRIPTION OF THE DRAWINGS

The preferred and alternative embodiments of the present invention are described in detail below with reference to the following drawings.

DETAILED DESCRIPTION OF THE INVENTION

The present invention relates to apparatus for improved fiber optic systems, and more specifically, to fiber optic links having a built-in test. Many specific details of certain embodiments of the invention are set forth in the following description and in FIGS. 1–5 to provide a thorough understanding of such embodiments. One skilled in the art, however, will understand that the present invention may have additional embodiments, or that the present invention may be practiced without several of the details described in the following description.

In general, apparatus and methods in accordance with the present invention may include a fiber optic link having a built-in test or health monitoring capability. In one embodiment, a fiber optic system in accordance with the present invention utilizes a signal source (e.g. laser), the signal source being used for generating both the primary signals that comprise the main communication function of the fiber optic system, and also supplemental signals for performing a built-in test or health monitoring function. The supplemental signals associated with the test and monitoring function may be transmitted through the fiber optic system at a substantially lower data rate (frequency) than that of the primary signals associated with the primary communication function. The supplemental signals may then be extracted using, for example, an appropriate band-pass filter, and processed in order to evaluate the health of the fiber optic system.

Figure 1:
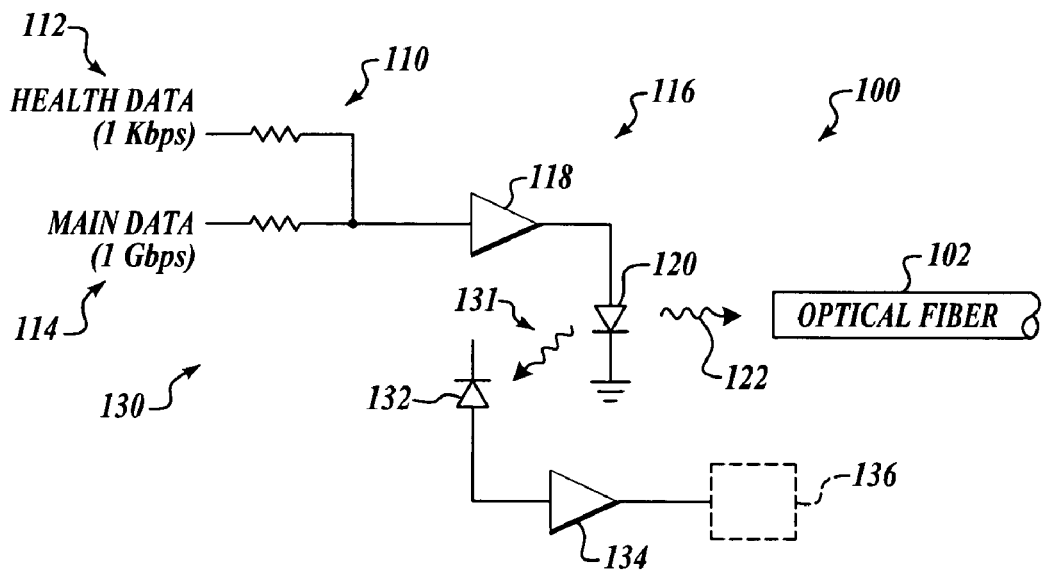
FIG. 1 is a schematic view of a transmitter assembly operating in conjunction with an optical fiber in accordance with an embodiment of the present invention.

FIG. 1 is a schematic view of a transmitter assembly 100 operating in conjunction with an optical fiber 102 in accordance with an embodiment of the present invention. In this embodiment, the transmitter assembly 100 includes a signal generation device 110 having a health data component 112 and a main data component 114 operatively coupled to a signal generator 116. In the embodiment shown in FIG. 1, the signal generator 116 includes a laser driver 118 and a laser diode 120. The health data component 112 is adapted to drive the signal generator 116 to generate appropriate supplemental signals that are indicative of the health of the transmitter assembly 100, or one or more other components of the optical system that includes the transmitter assembly 100. In a preferred embodiment, the laser driver 118 is an analog device that preserves the low-amplitude health (supplemental) signal. Similarly, the main data component 112 is adapted to drive the signal generator 116 to generate the primary signals associated with the main communication function of the transmitter assembly 100. In response to the commands from the health data and main data components 112, 114, the signal generator 116 transmits a combined signal 122 that includes both the primary and supplemental signals to the optical fiber 102 for transmission to other components of the optical system.

As further shown in FIG. 1, the transmitter assembly 100 may further include a monitoring component 130 that receives an auxiliary signal 131 from the signal generator 116. In this embodiment, the monitoring component 130 includes a detector 132. The auxiliary signal 131 may be the same as the combined signal 122, or a portion thereof containing the supplemental signal. The monitoring component 130 may further include a signal conditioner 134 (e.g. a bias resistor, an amplifier, a filter, etc.) and a monitoring processor 136 that is adapted to receive the auxiliary signal 131 (or a portion thereof) and to processes it to evaluate the health of the optical system or individual components thereof.

Figure 2:
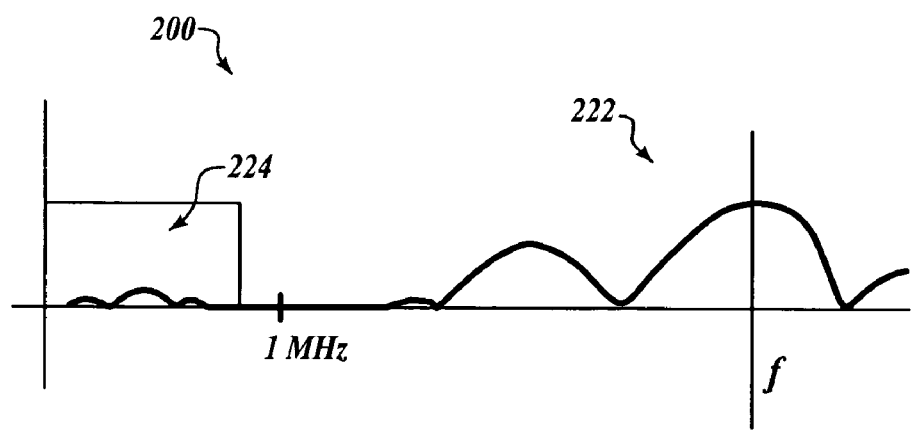
FIG. 2 is a graph of a spectral distribution of a combined signal including a built-in test portion in accordance with an embodiment of the present invention.

FIG. 2 is a graph of a spectral distribution 200 of a combined signal 122 including a built-in test portion 224 in accordance with an embodiment of the present invention. As shown in FIG. 2, the combined signal 122 includes a high frequency portion 222 corresponding to the primary signals associated with the main communication function, and a low frequency (or built-in test) portion 224 corresponding to the supplemental signals that are indicative of the health of the optical system. In the embodiment shown in FIG. 2, the combined signal 122 includes a high frequency (primary signal) portion 222 having a spectral distribution centered around a primary frequency of, in this example, approximately 500 MHz, and a low frequency (supplemental signal) portion 224 having a spectral distribution centered around a supplemental frequency of, for example, approximately 1 KHz.

With continued reference to FIG. 2, in a representative modem gigabit communications link (e.g. Fibre Channel, GigaBit Ethernet, IEEE 1394b, Infiniband, RapidIO, etc.), the primary signal 222 may typically be spectrally shaped by its coding scheme so that its energy is approximately zero at frequencies significantly below a basic modulation rate. Thus, in one representative embodiment, the primary signal 222 of a 1 gigabit-per-second link may have very little energy below 100 MHz and virtually no measurable energy below 10 MHz.

On the other hand, the rate at which health-related data (i.e. the supplemental signal 224) typically needs to be exchanged between nodes, in order to determine cable loss and other relevant data, may be comparatively modest. For example, a few tens of bytes of information exchanged at a rate of a few times per second may be sufficient to maintain all pertinent information about the health of the link. Thus, a transmission rate for the supplemental signal 224 that is substantially lower than the data transmission rate of the primary signal 224 (e.g. 1 kilobit per second) may be adequate for this purpose. Such a low-data-rate signal can be low-pass filtered with a very simple filter to a desired low-pass limiting frequency (e.g. 10 KHz), resulting in approximately no effect on Bit Error Rate (BER) performance of the 1 kilobit-per-second health link. Such a filtered supplemental signal 224 may also have virtually no harmonic energy above a predetermined frequency (e.g. 1 MHz as shown in the embodiment in FIG. 2). Thus, the primary (data) and supplemental (health) signals 222, 224 can be transmitted simultaneously on the same channel with approximately no measurable interference.

In addition, the amount of energy needed to generate the supplemental signals 224 may be extremely low in comparison with the energy needed to generate the primary signals 222. For example, in the embodiment shown in FIG. 1, a diode bias circuit may be used as described, for example, in U.S. Pat. No. 5,008,526 issued to Green, and which provides nearly complete isolation of the low-frequency 224 and high-frequency 222 components of the combined signal 122. In one representative embodiment, for example, using a Maxim MAX4478, which is not state-of-the-art in terms of noise but is inexpensive and small, we can expect a noise current given by the following Equation (1):

$$i_n^2 = (0.005 \text{ pA}/\sqrt{\text{Hz}})^2 B + 2qI_{D,ER}B + \frac{4kTB}{R_3} \quad (1)$$

where the first term on the right hand side of the equation is the current noise of the amplifier, the second term is the current shot noise, and the third term is the resistor thermal noise. Equation (1) is described more fully, for example, in the above-referenced U.S. Pat. No. 5,008,526 issued to Green. Specifically, $0.005$ pA$/\sqrt{\text{Hz}}$ is the amplifier's input current density, B is the bandwidth (e.g. roughly 1 KHz for a 1 Kbps health rate signal), q is the charge of an electron, $I_{D,ER}$ is the DC signal that occurs from the fact that the primary signal 222 is not completely extinguished during low levels (that is, the Extinction Ratio is not infinite), k is Boltzmann's constant, T is the temperature of the resistor (e.g. assume 300° C.), and $R_3$ is the resistance of the signal conditioner 314 (e.g. a health signal bias resistor) shown in FIG. 4.

For the three values on the right hand side of Equation (1), the shot noise due to the non-extinguished primary (data) signal 222 (the second term of Equation (1)) dominates, and in one embodiment, may typically produce a noise of approximately 10 pA or less. Thus, even at a relatively small value of the supplemental (health) signal 224 of, for example, 1.5 nA, the Signal-to-Noise Ratio (SNR) is so very high that virtually no errors can occur over any reasonable length of time.

Furthermore, in yet another aspect of the present invention, if the supplemental (health) signal 224 is Manchester-encoded, then there is little energy at relatively low frequencies (e.g. below 500 Hz for a 1 Kbps supplemental signal 224 rate). Thus, even if there is a significant noise signal (e.g. a 60 Hz residual signal from the power supply) it will have virtually no effect on the decoding of the supplemental signal 224.

For example, in one exemplary embodiment, typical primary (data) signal 222 levels are 0.5 mA maximum, corresponding to a 1 mW optical signal with a detector with quantum efficiency of 0.5, and 1.5 µA minimum (depending on the loss in the optical fiber and connectors). For the maximum data current of 0.5 mA, with a 500 nA health signal current (1/1000 of the data), the loss due to devoting part of the signal budget to the supplemental signal (health component) 224 is given by the following Equation (2):

Apparent Data Signal Loss Due to Concurrent
Health Signal=$10 \log [1-(500e^{-9})/(0.5e^{-3})]$
=0.004 db (Eq. 2)

Thus, for the exemplary embodiment described above, the amount of loss shown in Equation (2) is a relatively small loss that may have will have practically no effect on any reasonable link budget (for example, a typical connector loss may be on the order of 0.5 dB).

As previously mentioned, if the current level of the supplemental (or health) signal 224 is 1/1000 the amplitude of the primary (data) signal 222, then when the data signal 222 is at its maximum of 0.5 mA, the health signal 224 may also be at its maximum of 500 nA. On the other hand, a typical minimum value for the data signal 222 optical power might be 1.5 μA at which point the health signal 224 minimum value may be 1.5 nA. Since the health path noise current is approximately 10 pA or less and since a signal 10 times the noise RMS value produces a Bit Error Rate (BER) much better than $10^{-12}$, then the health signal 224 will operate to signal levels that are 12 dB below the worst-case minimum.

In other words, using the representative signal values described above, the health signal 224 may operate through an attenuation due to breakage or defect in the system of approximately 12 dB or more. In fact, in alternate embodiments, the health signal 224 may successfully operate through breaks having attenuations far greater than 12 dB.

If a fiber break occurs with more than 12 dB attenuation, embodiments of the present invention may still operate successfully through it. For example, as in the previously described embodiment, assuming that the original signal consisted of a data signal 222 that was a 1000 times larger in amplitude than the health signal 224. However, if it becomes apparent that something is wrong and that a severe break or defect has occurred in the optical system, then in alternate embodiments of the present invention, most or substantially all of the optical power of the signal source 116 may be diverted into the health signal 224. In one representative embodiment, for example, the health signal 224 can be boosted by as much as 30 dB (that is, by approximately 1000 times), which may permit the health signal 224 to successfully operate through a break with an attenuation of 30 dB+12 dB =42 dB. In other words, in this representative example, only 1/10000 of the light has to make it across the break for the health signal 224 to be detected properly. Thus, in further alternate embodiments, health information may be exchanged through almost any break.

Typical signals that may be monitored in accordance with embodiments of the present invention include, but are not limited to, transmitter laser power, detector signal current, power supply voltage, power supply current, transmitter laser temperature, average case temperature, or any other suitable signal. In a preferred embodiment, both the transmitter laser power and the detector signal current may be included in the health signal 224 and exchanged across the link in order to continuously determine the health of both the far-end node and the cable plant loss. In alternate embodiments, one or more of the other types of signals may be included in the health signal 224.

Referring again to FIG. 1, the microcontroller 136 of the transmitter assembly 100 may monitor the supplemental signals 224, and perform processing (e.g. time-averaging, trend analysis, cable plant loss, etc.) on the supplemental signals 224. The microcontroller 136 may store these values and then transfer them to another processor (e.g. a processor external to the transmitter assembly 100). In one representative embodiment, the microcontroller 136 may be an Atmel ATmega16L microcontroller having a 44-pin small-footprint IC with 8 A/D channels (for monitoring the above parameters plus sampling the input health signal 224), four PWM signals which may be used, for example, to set data and health power levels. In a further embodiment, a rich instruction set may be stored in the microcontroller 136 that consumes low power and provides sufficient speed to oversample and process the incoming health signal sequence.

Figure 3:
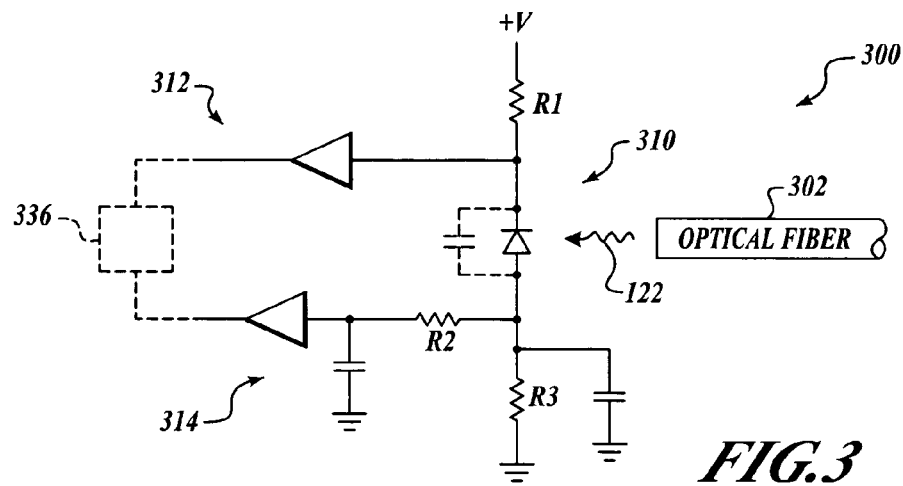
FIG. 3 is a schematic view of a receiver assembly operating in conjunction with an optical fiber in accordance with an embodiment of the present invention.

FIG. 3 is a schematic view of a receiver assembly 300 operating in conjunction with an optical fiber 302 in accordance with another embodiment of the present invention. In this embodiment, the receiver assembly 300 includes a reception device 310 that receives the combined signal 122 from the optical fiber 302. A health data portion 312 and a main data portion 314 are operatively coupled to the reception device 310. The main data portion 314 is adapted to receive the primary (data) signals 224 from the combined signal 122 that constitute the primary communication function of the optical system. Similarly, the health data portion 312 is adapted to receive the supplemental (health) signals 222 from the combined signal 122 that provide monitoring information on the health of the optical system. R1 provides the data-side current-to-voltage conversion, R3 provides the health-signal current-to-voltage conversion, and R2, in conjunction with the 10pF capacitors, lowpass filters the health signal to remove any residual data information. As further shown in FIG. 3, the receiver assembly 300 may further include a processor 336 that is adapted to receive at least one of the supplemental signal 224 and the primary signal 222 (or portions thereof) and process the received signal(s) to evaluate, for example, the health of the optical system or individual components thereof.

Figure 4:
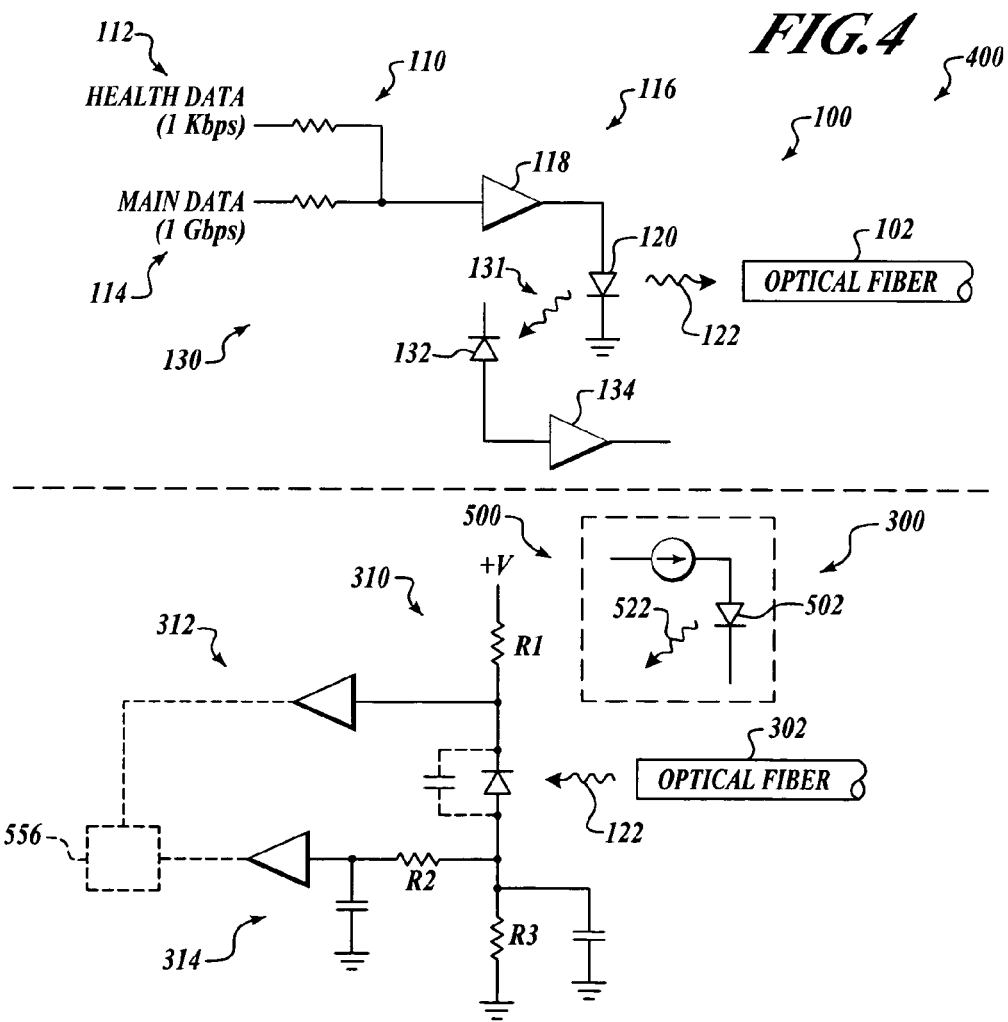
FIG. 4 is a schematic view of a transceiver assembly operating in conjunction with first and second optical fibers in accordance with another embodiment of the present invention.

FIG. 4 is a schematic view of a transceiver assembly 400 in accordance with yet another embodiment of the present invention. The transceiver assembly 400 includes a transmitter assembly 100 and a receiver assembly 300 operating in conjunction with first and second optical fibers 102, 302. In at least some embodiments, the transmitter assembly 100 and the receiver assembly 300 may be of substantially the same construction as the embodiments described above with reference to FIGS. 1 and 3. For the sake of brevity, the components of the transmitter and receiver assemblies 100, 300 that were already described above will not be described again. The receiver assembly 300 may be operatively coupled to the transmitter assembly 100 so that a combined signal 122 received by the receiver assembly 100 from the optical fiber 302 may be communicated to the transmitter assembly 100, and then transmitted by the transmitter assembly 100 to the other optical fiber 102.

As further shown in FIG. 4, the transceiver assembly 400 further includes an additional signal emitting assembly 500 adapted to transmit an additional signal 522. In this embodiment, the additional signal emitting assembly 500 includes a signal source 502 (e.g. an LED). The additional signal emitting assembly 500 is adapted to transmit the additional signal 522 to the reception device 310 of the receiver assembly 300. The additional signal 522 may then be received and processed as described above to assess a health condition of the transceiver assembly 400. In this way, additional fault isolation can be accomplished. For example, if the receiver 310 begins to show excessive attenuation on the health and/or data signal, it is generally important to isolate the fault to a damaged fiber or a bad detector. If the receiver 310 still responds with proper gain to the additional signal 500 then the fault can be asserted to occur with the fiber.

Some embodiments of the present invention may be advantageously employed to isolate faults within various components of an optical system, including, for example, to a transmitter assembly, a fiber optic cable plant, a receiver, or a variety of other components. This capability may enable a technician working on an optical system (e.g. within an aircraft) to isolate and repair faults more efficiently. More specifically, in a particular embodiment, to allow such fault isolation, the additional signal emitting assembly 500 shown in FIG. 4 may be operated at extremely low frequency (e.g. 10 Hz) and at relatively low power (e.g. <<1 μW) as a means of testing the detector and its associated electronics.

The microcontroller 556 may then be programmed to include a highly resonant bandpass filter at 10 Hz (or whatever modulation frequency is appropriate for the additional signal emitting assembly 500) that detects the additional signal 522 but rejects the substantial non-extinguished part of the combined signal 122. This bandpass filter will reject virtually all noise (since its bandwidth can be made extremely narrow). It will be appreciated that in an exemplary embodiment, a 10 Hz bandpass filter with a BW of approximately 1 Hz may be extremely difficult to generate in analog form, but may be straightforward and relatively easily accomplished in a digital signal processing environment.

As a result of this additional signal emitting assembly 500, a determination can be made after the loss of data as to whether the problem is with the reception device 310 of the receiver assembly 300 (e.g. the detector and its associated electronics) or with the fiber. If the reception device 310 continues to respond to the signal source 502 of the additional signal emitting assembly 500, then the reception device 310 is operable and the problem is with the fiber. No detection of the signal source 502 means that the reception device 310 or its associated electronics are bad.

Figure 5:
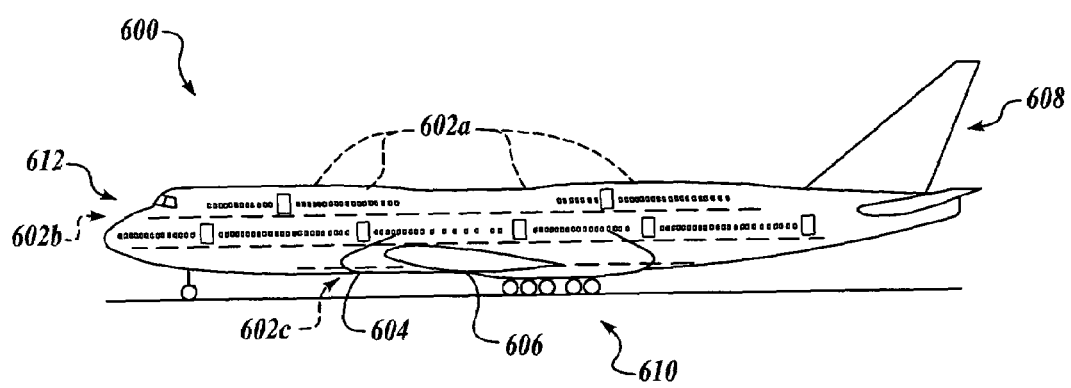
FIG. 5 is a side elevational view of an aircraft having one or more fiber optic systems or system components in accordance with a further embodiment of the present invention.

It will be appreciated that a wide variety of apparatus may be conceived that incorporate optical systems that include apparatus and methods in accordance with various embodiments of the present invention. For example, FIG. 5 is a side elevational view of an aircraft 600 having one or more optical systems 602 in accordance with embodiments of the present invention. In general, except for the various optical systems 602, the various components and subsystems of the aircraft 600 may be of known construction and, for the sake of brevity, will not be described in detail herein.

As shown in FIG. 5, the aircraft 600 includes one or more propulsion units 604 coupled to a fuselage 605, wing assemblies 606 (or other lifting surfaces), a tail assembly 608, a landing assembly 610, a control system 612 (not visible), and a host of other systems and subsystems that enable proper operation of the aircraft 600. The aircraft 600 shown in FIG. 5 is generally representative of a commercial passenger aircraft, including, for example, the 737, 747, 757, 767, and 777 models commercially-available from The Boeing Company. The inventive apparatus and methods disclosed herein, however, may also be employed in any other types of aircraft, such as rotary aircraft or manned military aircraft, including those described, for example, in The Illustrated Encyclopedia of Military Aircraft by Enzo Angelucci, published by Book Sales Publishers, September 2001.

More specifically, the aircraft 600 may include one or more embodiments of optical systems 602a in accordance with the present invention that operate at connections across bulkheads within the airframe and/or fuselage of the aircraft structure. Similarly, the aircraft 600 may include one or more noise-feedback controlled optical systems 602b incorporated into the flight control system 612, and one or more noise-feedback controlled optical systems 602c for controlling the propulsion units 604, including, for example and not by way of limitation, the optical systems generally described in U.S. Pat. No. 5,809,220 issued to Morrison et al., U.S. Pat. No. 6,369,897 B1 issued to Rice et al., U.S. Pat. No. 6,266,169 B1 issued to Tomooka et al., U.S. Pat. No. 5,653,174 issued to Halus, U.S. Pat. No. 5,295,212 issued to Morton et al., U.S. Pat. No. 5,222,166 issued to Weltha, and U.S. Pat. No. 5,119,679 issued to Frisch. Clearly, a wide variety of optical systems 602 in accordance with embodiments of the present invention may be conceived for incorporation into the various subsystems of the aircraft 600.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. An optical component, comprising:
a signal source adapted to output a first combined optical signal having a first optical signal portion of a first frequency and a second optical signal portion of a second frequency, the first frequency being substantially greater than the second frequency; and
a controller operatively coupled to the signal source and being adapted to induce the signal source to output the first and second optical signal portions, the first optical signal portion being associated with a main communication function and the second optical signal portion being associated with a monitoring function.

2. The optical component of claim 1, further comprising a receiver assembly adapted to receive a second combined optical signal and to separate a third optical signal portion of a third frequency and a fourth optical signal portion of a fourth frequency therefrom, the third frequency being substantially greater than the fourth frequency, the third optical signal portion being associated with the main communication function and the fourth optical signal portion being associated with the monitoring function.

3. The optical component of claim 2, wherein the receiver assembly includes at least one of a high-pass filter and a low-pass filter adapted to separate at least one of the third and fourth optical signal portions, respectively, from the second combined optical signal.

4. The optical component of claim 2, wherein the receiver assembly is operatively coupled to the transmitter assembly and adapted to communicate signals indicative of the second combined optical signal to the transmitter assembly, the transmitter assembly being adapted to receive the signals indicative of the second combined optical signal and to transmit the first combined optical signal based thereon.

5. The optical component of claim 1, further comprising a monitoring component operatively positioned relative to the signal source and adapted to receive at least a portion of the second signal and adapted to perform a monitoring function based thereon.

6. The optical component of claim 5, wherein the monitoring function includes at least one of a time-averaging process, a trend analysis process, and a cable plant loss process.

7. The optical component of claim 1, wherein the first frequency is at least approximately three orders of magnitude greater than the second frequency.

8. The optical component of claim 1, wherein the first optical signal portion has a first spectral distribution centered around the first frequency and the second optical signal portion has a second spectral distribution centered around the second frequency.

9. The optical component of claim 1, wherein the signal source includes a laser diode.

10. The optical component of claim 1, wherein at least one of the signal source and the controller includes an analog source driver device.

11. The optical component of claim 1, wherein the controller includes a main component that drives the signal source to produce the first optical signal portion, and a monitoring component that drives the signal source to produce the second optical signal portion.

12. An optical component, comprising:
- a receiver assembly adapted to receive a combined optical signal from a single optical signal source and to separate from the combined optical signal a first optical signal portion of a first frequency and a second optical signal portion of a second frequency, the first frequency being substantially greater than the second frequency; and
- a controller operatively coupled to the receiver assembly and being adapted to process the first and second optical signal portions, the first optical signal portion being associated with a main communication function and the second optical signal portion being associated with a monitoring function.

13. The optical component of claim 12, further comprising a signal source adapted to output a second combined optical signal having a third optical signal portion of a third frequency and a fourth optical signal portion of a fourth frequency, the third frequency being substantially greater than the fourth frequency, the third optical signal portion being associated with the main communication function and the fourth optical signal portion being associated with the monitoring function.

14. The optical component of claim 13, further comprising a monitoring component operatively positioned relative to the signal source and adapted to receive at least a portion of the fourth signal and adapted to perform a monitoring function based thereon.

15. The optical component of claim 14, wherein the monitoring function includes at least one of a time-averaging process, a trend analysis process, and a cable plant loss process.

16. The optical component of claim 13, wherein the controller includes a main component that drives the signal source to produce the third optical signal portion, and a monitoring component that drives the signal source to produce the fourth optical signal portion.

17. The optical component of claim 13, wherein the receiver assembly is operatively coupled to the transmitter assembly and adapted to communicate signals indicative of the combined optical signal to the transmitter assembly, the transmitter assembly being adapted to receive the signals indicative of the combined optical signal and to transmit the second combined optical signal based thereon.

18. The optical component of claim 13, wherein the signal source includes a laser diode.

19. The optical component of claim 13, wherein at least one of the signal source and the controller includes an analog source driver device.

20. The optical component of claim 12, wherein the first frequency is at least approximately three orders of magnitude greater than the second frequency.

21. The optical component of claim 12, wherein the first optical signal portion has a first spectral distribution centered around the first frequency and the second optical signal portion has a second spectral distribution centered around the second frequency.

22. The optical component of claim 12, wherein the controller includes a main component that processes the first optical signal portion, and a monitoring component that processes the second optical signal portion.

23. The optical component of claim 12, wherein the receiver assembly includes at least one of a high-pass filter and a low-pass filter adapted to separate at least one of the first and second optical signal portions, respectively, from the combined optical signal.

24. A method of operating an optical system, comprising:
- transmitting a combined optical signal from a single optical signal source, the combined optical signal having a first portion characterized by a first frequency and a second portion characterized by a second frequency, the first frequency being substantially greater than the second frequency;
- receiving the combined optical signal;
- separating the first and second portions;
- processing the first portion to derive a primary data signal; and
- processing the second portion to derive a health data signal.

25. The method of claim 24, wherein transmitting a combined optical signal includes transmitting a combined optical signal wherein the first frequency is at least approximately three orders of magnitude greater than the second frequency.

26. The method of claim 24, wherein transmitting a combined optical signal includes transmitting a combined optical signal wherein the first optical signal portion has a first spectral distribution centered around the first frequency and the second optical signal portion has a second spectral distribution centered around the second frequency.

27. The method of claim 24, wherein transmitting a combined optical signal includes transmitting a combined optical signal using a laser diode.

28. The method of claim 24, wherein transmitting a combined optical signal includes transmitting a combined optical signal using an analog source driver device.

29. The method of claim 24, wherein transmitting a combined optical signal includes transmitting a combined optical signal using a controller having a main component that drives the signal source to produce the first optical signal portion, and a monitoring component that drives the signal source to produce the second optical signal portion.

30. The method of claim 24, wherein separating the first and second portions includes separating the first and second portions using at least one of a high-pass filter and a low-pass filter adapted to separate at least one of the first and second portions from the combined optical signal.

* * * * *

UNITED STATES PATENT AND TRADEMARK OFFICE
CERTIFICATE OF CORRECTION

PATENT NO. : 7,027,685 B2 Page 1 of 1
APPLICATION NO. : 10/644124
DATED : April 11, 2006
INVENTOR(S) : Daniel N. Harres It is certified that error appears in the above-identified patent and that said Letters Patent is hereby corrected as shown below:

Column 1, line 3, add the following paragraph:

STATEMENT OF GOVERNMENT INTEREST

This invention was made with Government support under N00019-04-C-0005 awarded by the United States Navy. The Government has rights in this invention.

Signed and Sealed this

Twenty-second Day of August, 2006

JON W. DUDAS
*Director of the United States Patent and Trademark Office*